(12) United States Patent
Reisinger et al.

(10) Patent No.: US 6,542,145 B1
(45) Date of Patent: Apr. 1, 2003

(54) SELF-ILLUMINATING LCD DISPLAY DEVICE

(75) Inventors: Achim Reisinger, Hofheim (DE); Christoph Rupp, Köln (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/545,033

(22) Filed: Apr. 6, 2000

(30) Foreign Application Priority Data

Apr. 13, 1999 (DE) .......................................... 199 16 747

(51) Int. Cl.[7] .................................................. G09G 3/36
(52) U.S. Cl. .......................................... 345/102; 345/5
(58) Field of Search .......................... 345/87, 48, 102, 345/5; 349/74, 89, 111; 350/335

(56) References Cited

U.S. PATENT DOCUMENTS

| 3,811,751 A | | 5/1974 | Myer |
| 4,959,642 A | * | 9/1990 | Sharples ........................ 345/5 |
| 5,121,234 A | | 6/1992 | Kucera |
| 5,796,509 A | | 8/1998 | Doany et al. |

FOREIGN PATENT DOCUMENTS

| JP | 59037530 | 1/1984 |
| WO | 9738347 | 10/1997 |

OTHER PUBLICATIONS

"Application of Polymer Light–Emitting Materials in Light-Emitting Diodes, Blacklights and Displays" by R.J. Visser in Philips J. Res. 51 (1998) 467–477.

* cited by examiner

Primary Examiner—Amare Mengistu
(74) Attorney, Agent, or Firm—Martin A. Farber

(57) ABSTRACT

A invention relates to a self-illuminating LCD display device containing an LCD module with a first polarizer layer (1), a first transparent substrate (2), a first transparent electrode layer (3), a liquid crystal layer (4), a second transparent electrode layer (5), a second transparent substrate (6) and a second polarizer layer (7), and containing an LED module for illuminating the LCD module, having a third transparent electrode layer (9), a layer (10) containing organic light-emitting materials, a fourth electrode layer (11) and a substrate (12) as well as, if appropriate, further layers contained between the third and fourth electrode layer. A self-illuminating LCD display device according to the invention which is particularly easy to produce is distinguished in that one of the polarizer layers or, when the polarizer layer is arranged between the substrate and electrode layer, the substrate carrying it, is the substrate for the third transparent electrode layer.

17 Claims, 2 Drawing Sheets

SELF-ILLUMINATING LCD DISPLAY DEVICE

FIELD AND BACKGROUND OF THE INVENTION

SUMMARY OF THE INVENTION

The invention relates to a self-illuminating LCD display device.

It is known, for example, from the article Displays" by R. J. Visser in Philips J. Res. 51 (1998) 467–477, to illuminate LCD display devices by backlighting using planar polymeric light-emitting diodes. This illumination can be used, on the one hand, to intensify the contrast when the display device is used in daylight, and on the other hand to illuminate the display device in darkness.

The use of two modules has, however, the disadvantage that there is a need for additional mounting steps which are, in addition, very difficult to execute since the two planar elements must be designed in a very flat fashion and aligned exactly parallel to one another, in order, for example, to avoid the formation of Newton rings.

U.S. Pat. No. 3,811,751 discloses a self-illuminating LCD display device which has an LCD layer and a flat electroluminescent element as backlighting, between which there are located two layers of a film for influencing the light emitted by the electroluminescent element and having strip-shaped microstops inclined with respect to the perpendicular serve the purpose of deflecting the light emitted by the electroluminescent element such that when viewed in a direction perpendicular to the surface of the LCD display device, the background appears dark and only light deflected by LCD pixels passes to the observer. However, the contrast is reversed from other, lateral directions of view.

It is the object of the invention to provide a self-illuminating LCD display device which is easy to produce and mount and whose actual viewing angle range is determined by the actual LCD layer.

The object is achieved by means of an LCD display device having the features of claim 1.

The polarizer layers of the LCD module can be arranged on the side of the appropriate substrate averted from the liquid crystal layer, or between the substrates of the module and the electrode layers.

The idea of using the polarizer facing the backlighting or, when the polarizer is arranged between the electrode layer and substrate, of using the substrate of the LCD module facing the backlighting as substrate for the transparent electrode of the LED module eliminates problems in connection with the planeness and the accuracy of fit of the surfaces of the illumination unit. Moreover, one substrate less is used. Finally, the mounting steps for assembling the elements are eliminated.

Except for the arrangement of the third electrode layer, the LCD module and the LED module can be designed in a fashion corresponding to the prior art.

Apart from that, any desired materials can be used as organic light emitting materials, light emitting polymers being preferred.

Advantageous developments of the invention are defined in the subclaims.

A self-illuminating LCD display device according to the invention preferably has a sealing element which is arranged like a frame along the circumference of the surface of the LCD module between the first transparent substrate and the second transparent substrate or solid layers respectively arranged thereon. Likewise, it is advantageous for the purpose of lengthening the service life of the light emitting layer when a sealing element is arranged like a frame along the circumference of the surface of the LED module between the second transparent substrate and the third substrate or solid layers respectively arranged thereon, with the result that the interior is enclosed in an airtight and watertight fashion.

The transparent electrode layers are preferably formed by indium zinc oxide layers (ITO layers).

The transparent substrates are preferably glass plates.

The fourth electrode layer can contain suitable metals, for example aluminum or calcium.

In order to increase the luminescence efficiency in the direction of the LCD layer, the metal layer is preferably designed such that it reflects the emitted light. Alternatively, it is possible for a further reflecting layer to be arranged behind the metal layer, or for the substrate to be made from appropriately reflecting material.

A transparent display device is obtained if the fourth electrode layer and a third substrate are of transparent design.

The LED module can contain, between the electrode layers, still further layers which are known to the person skilled in the art and improve the functioning of this module. A polymeric protective layer is preferably arranged between the transparent electrode layer in the LED module and the layer with organic light emitting materials, in order to lengthen the service life.

The LED module is preferably designed to represents regions of different color, which can be done, for example, by forming appropriately driveable regions with the aid of organic materials emitting light of different colors.

It is preferred, furthermore, for the layer with organic light emitting materials to have a strip structure the layer with organic light-emitting materials having a strip structure in which at least two types of strips are arranged alternately, and strips of one type respectively have organic light emitting materials which emit light of a specific color, it being possible to achieve suitable, mixing of the emitted light. It is particularly preferred for the strips to be so narrow that they cannot be resolved by the human eye from a typical viewing distance.

It is preferred in this case that the third or the fourth electrode layer is structured in accordance with the strip structure for the purpose of driving the strip of one type in each case, such that the color of the backlighting can be varied by the drive. By contrast with polychromatic matrix displays which are used to produce light of mixed colors, only one electrode need be structured in order to produce light of mixed colors.

During operation, the strips are driven such that light of a desired color is emitted. The second transparent substrate can be designed as a diffusing screen for better mixing of the light.

It is particularly preferred to use at least three types of strip whose organic light emitting materials are selected such that with suitable driving the mixing of the emitted light of the strips yields white light.

If, in this case, the width of the strips corresponds to the size of the pixels of the LCD module, and if the strips are aligned with these pixels, it is possible in a particularly preferred fashion to implement a self-illuminating, color display device, in particular with simultaneous operation of all types of strips. This requires the LCD module to be designed only as a monochromatic display device except for the drive. Driveable color filters in the LCD module can be dispensed with entirely.

In this case, the arrangement of the second and third ITO layers eliminates difficult subsequent adjustment of the LED module with the LCD module in the case of a simple combination of an LCD module with a separate LED module.

The LCD module can, however, also be designed for displaying polychromatic displays in conjunction with monochromatic or white illumination. In this embodiment, an exact alignment of pixels of the LCD module and strips of the LED module is superfluous, particularly when use is made of an LED module with strip structure.

BRIEF DESCRIPTION OF THE DRAWINGS

Exemplary embodiments of the invention are described with the aid of the figures of the drawings, in which.

DETAILED DESCRIPTION OF THE PREFERRED EMBODIMENT

Figure 1:
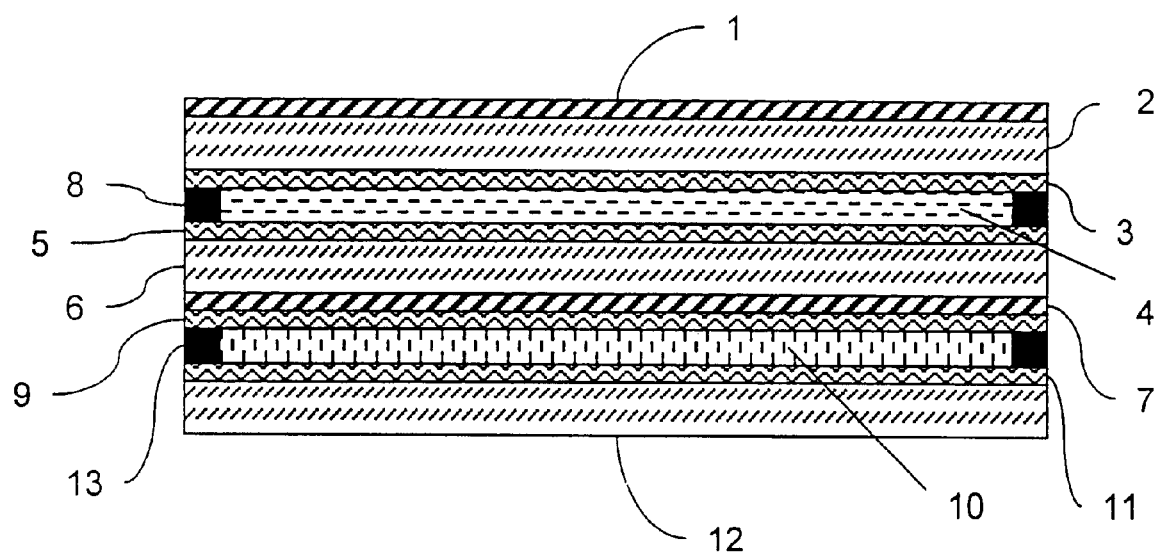
FIG. 1 shows a section through a self-illuminating LCD display device according to a first embodiment of the invention.

In FIG. 1, a self-illuminating LCD display device has an LCD module having a polarizer layer 1, a glass plate 2 serving as substrate, and a first ITO layer 3 (indium zinc oxide layer) as first transparent electrode layer, and also has a liquid crystal layer 4, a second ITO layer 5, serving as second transparent electrode layer, a glass plate 6 serving as second transparent substrate, and a second polarizer layer 7. The liquid crystal layer 4 is enclosed in an airtight and watertight fashion by an adhesive frame 8, serving as sealing element, which runs along the circumference of the LCD module.

Provided on the second polarizer layer 7 is a third ITO layer 9 serving as third electrode layer, a light-emitting polymer layer 10, an ITO layer 11 serving as fourth electrode layer, and a glass plate 12 serving as third substrate. The layer with light-emitting polymer is enclosed in a light-tight and watertight fashion by a second adhesive frame 13, which serves as sealing element and runs along the circumference of the LED module.

The LCD module is driven in the usual way, while the LED module is switched to continuous illumination.

Figure 2:
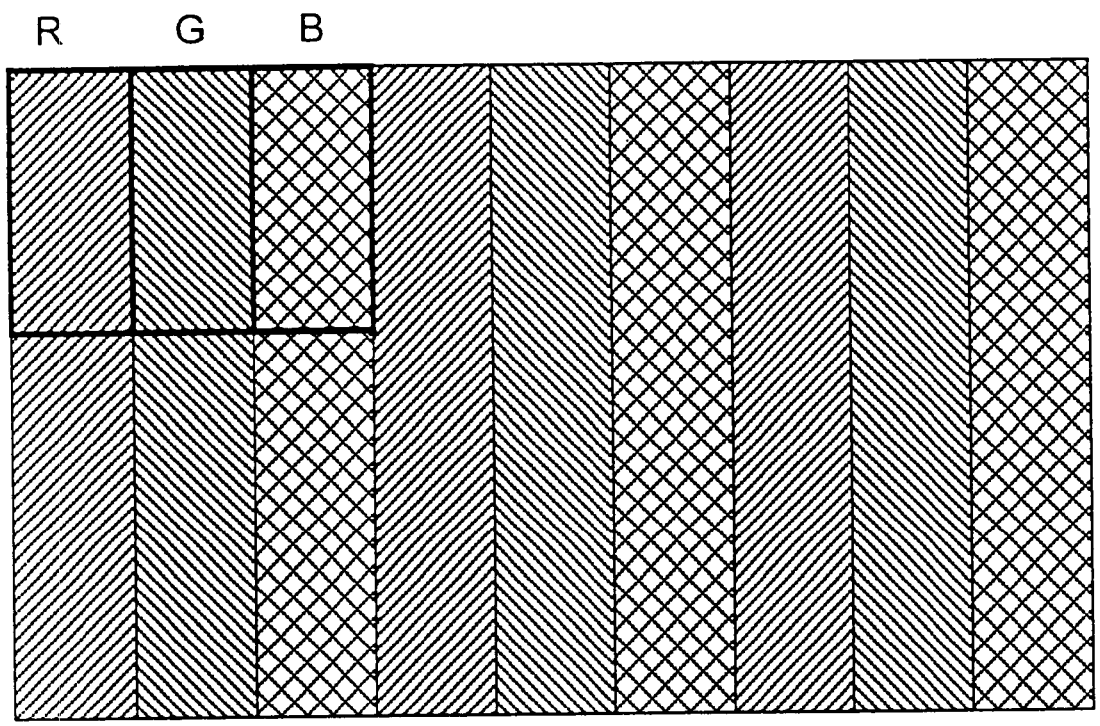
FIG. 2 shows a plan view of an LED module according to a second embodiment of the invention.

A self-illuminating LCD display device according to a second embodiment of the invention essentially has the same design as the first embodiment. However, as shown in FIG. 2, in this second embodiment the layer with organic light emitting materials has a strip structure in which three types of strips are arranged alternately; the types differ from one another in the color of the light emitted by the organic light-emitting materials contained in the strips of this type. All the colors of red (R), green (G) and blue (B) are provided, with the result that a mixture of the emitted light produces white light giving suitable driving. The width of the strips is so small that the strip structure can no longer be resolved with the human eye when viewed normally.

The third electrode layer is structured in accordance with the strip structure such that strips of in each case one type can be driven independently of those of another type. All the strips shine simultaneously during operation, with the result that white light is produced. In principle, however, other color mixtures can be emitted by means of other drives.

The LCD module has the design of an LCD display device for monochromatic operation; the pixels of this display device are denoted here as subpixels. Their size corresponds precisely to the width of one strip and they are arranged directly over the strip. As shown in FIG. 2, three subpixels R, G, B arranged above neighboring strips form a pixel of the image to be displayed. The side length ratio of the subpixels is preferably selected such that the pixel formed by them has equal side lengths. Since the subpixels are constantly illuminated, it is possible by setting their transmittance to set the color of a pixel by mixing the light intensities of the three subpixels with red, green and blue colors. A self-illuminating color LCD display device is easily obtained as a result.

By virtue of the fact that the third electrode layer (for the LED module) and second electrode layer (for the LCD module) which are to be structured are provided on one substrate, the strips and the subpixels can be aligned with one another very accurately as early as during production, for example by carrying out the structuring step on both sides.

We claim:

1. A self-illuminating LCD display device comprising an LCD module with an LED module for illuminating the LCD module, the LCD module comprising a first polarizer layer (1), a first substrate (2), a first electrode layer (3), a liquid crystal layer (4), a second electrode layer (5), a composite layer having a second substrate (6) and a second polarizer layer (7); wherein the LED module comprises a third electrode layer (9), a layer (10) containing organic light-emitting materials, a fourth electrode layer (11) and a third substrate (12); wherein at least said first and said second substrates are transparent and at least said first electrode layer and said second electrode layer and said third electrode layer are transparent, and said composite layer of said LCD module is in contact with said third electrode layer of said LED module.

2. The self-illuminating LCD display device as claimed in claim 1, wherein a sealing element (8) is arranged like a frame along the circumference of the surface of the LCD module between said first transparent substrate (2) and said second transparent substrate (6) or solid layers (1, 3, 5, 7) respectively arranged thereon.

3. The self-illuminating LCD display device as claimed in claim 1, wherein a sealing element (13) is arranged like a frame along the circumference of the surface of the LED module between the second transparent substrate (6) and the third transparent substrate (12) or solid layers (7, 9, 11) respectively arranged thereon, with the result that the interior is enclosed in an airtight and watertight fashion.

4. The self-illuminating LCD display device as claimed in claim 1, wherein the transparent substrates (2, 6) are glass plates.

5. The self-illuminating LCD display device as claimed in claim 1, wherein the third substrate (12) is transparent.

6. The self-illuminating LCD display device as claimed in claim 1, wherein the fourth electrode layer (11) is transparent.

7. The self-illuminating LCD display device as claimed in claim 1, wherein the fourth electrode layer (11) is a metal layer.

8. The self-illuminating LCD display device as claimed in claim 1, wherein the transparent electrode layers (3, 5, 9) contain indium zinc oxide (ITO).

9. The self-illuminating LCD display device as claimed in claim 1, wherein a polymeric protective layer is arranged between the transparent electrode layer (9) in the LED module and the layer (10) with organic light emitting materials.

10. The self-illuminating LCD display device as claimed in claim 1, wherein the LED module is formed to represent regions of different color.

11. The self-illuminating LCD display device as claimed in claim 1, wherein the layer (11) with organic light emitting materials has a strip structure (R, G, B) in which at least two types of strips are arranged alternately, and strips of one type respectively have organic light emitting materials which emit light of a specific color.

12. The self-illuminating LCD display device as claimed in claim 11, wherein the third or the fourth electrode layer (11) is structured in accordance with the strip structure for driving the strips of one type in each case.

13. The self-illuminating LCD display device as claimed in claim 11, wherein the width of the strips, corresponds to the width of the pixels of the LCD module, and wherein the strips are aligned with these pixels.

14. The self-illuminating LCD display device as claimed in claim 11, wherein there are at least three types of strip whose organic light emitting materials are selected such that with suitable driving the mixing of the emitted light of the strips yields white light.

15. The self-illuminating LCD display device as claimed in claim 1, wherein th e LCD module is a monochromatic display device except for the drive.

16. The self-illuminating LCD display device as claimed in claim 1, wherein the LCD module is formed for representing polychromatic displays in conjunction with monochromatic or white illumination.

17. A self-illuminating LCD display device comprising an LCD module with an LED module for illuminating the LCD module, the LCD module comprising a first polarizer layer (1), a first substrate (2), a first electrode layer (3), a liquid crystal layer (4), a second electrode layer (5), a composite layer having a second substrate providing the function of a second polarizer layer; wherein the LED module comprises a third electrode layer (9), a layer (10) containing organic light-emitting materials, a fourth electrode layer (11) and a third substrate (12); wherein at least said first and said second substrates are transparent and at least said first electrode layer and said second electrode layer and said third electrode layer are transparent, and said composite layer of said LCD module is in contact with said third electrode layer of said LED module.

* * * * *